United States Patent [19]
Meador et al.

[11] 3,893,020
[45] July 1, 1975

[54] DUAL RADIO FREQUENCY APPARATUS FOR DETERMINING ELECTROMAGNETIC CHARACTERISTICS OF EARTH FORMATIONS USING CONSTANT FLUX FIELD GENERATORS

[75] Inventors: Richard A. Meador; Larry W. Thompson, both of Houston, Tex.

[73] Assignee: Texaco Inc., New York, N.Y.

[22] Filed: Aug. 27, 1973

[21] Appl. No.: 391,899

[52] U.S. Cl. .................................................. 324/6
[51] Int. Cl. ......................... G01v 3/10; G01v 3/18
[58] Field of Search ............................... 324/1, 6–8

[56] References Cited
UNITED STATES PATENTS

| | | | |
|---|---|---|---|
| 2,139,460 | 12/1938 | Potapenko | 324/6 X |
| 2,900,595 | 8/1959 | Mengel et al. | 324/6 |
| 3,105,190 | 9/1963 | Norris | 324/6 |
| 3,259,837 | 7/1966 | Oshry | 324/6 |
| 3,551,797 | 12/1970 | Gouilloud et al. | 324/6 |

FOREIGN PATENTS OR APPLICATIONS

| | | | |
|---|---|---|---|
| 192,304 | 4/1967 | U.S.S.R. | 324/6 |

OTHER PUBLICATIONS

Daev, D. S., Dielectric Induction Logging, Izv. Vyssh. Ucheb. Zaved., Geol. Razved. 8 No. 11, 110–119, 1965.

Izyumov et al., Two Frequency Dielectric Induction Logging With Two Sondes, Geol. Geofiz. 9, No. 4, 94–101, (1968).

*Primary Examiner*—Gerard R. Strecker
*Attorney, Agent, or Firm*—T. H. Whaley; C. G. Ries; William J. Beard

[57] ABSTRACT

An illustrative embodiment of the invention includes apparatus for measuring the resistivity and dielectric characteristics of materials in the vicinity of a well borehole. Radio frequency transmitting apparatus using balun coupled transmitter coils electrostatically shielded are supplied with constant current AC at frequencies of 16 and 30 megahertz. A spaced receiver coil receives the voltages induced therein by the eddy currents in earth formations in the borehole vicinity at the 16 and 30 megahertz frequencies. Superheterodyne receiver means convert the total field voltage amplitude signals to a pair of intermediate frequency signals representative thereof which are transmitted to the surface via a triaxial well logging cable. The total field amplitudes at the two frequencies are detected and recorded as a function of borehole depth.

15 Claims, 11 Drawing Figures

DUAL RADIO FREQUENCY APPARATUS FOR DETERMINING ELECTROMAGNETIC CHARACTERISTICS OF EARTH FORMATIONS USING CONSTANT FLUX FIELD GENERATORS

BACKGROUND OF THE INVENTION

This invention relates to methods and apparatus for determining the characteristics of materials surrounding a well bore, and more particularly, relates to methods and apparatus for radio frequency dielectric induction well logging wherein the formation resistivity (or conductivity) and dielectric constant are uniquely determinable by a means of in situ measurements taken in a well borehole.

For many years it has been conventional practice to log the electrical characteristics of earth formations in the vicinity of a well borehole in order to determine the location of oil bearing strata. This has been made possible in the past by the use of electrical resistivity logs in wells using highly conductive (low resistivity) drilling fluid and by the use of induction well logs in wells drilled with oil base drilling muds or drilling fluids having higher resistivities. In conventional resistivity logs a current emitting electrode or electrode array arranged for focusing the emitted current is used to emit either direct current or very low frequency (such as 60 hertz) alternating currents into the earth formation surrounding the well borehole by means of contacting electrodes. These currents traverse a section of the earth formations and are detected at a current return electrode situated a spaced distance from the current emitting electrode. The magnitude of the detected currents can then provide an indication of the resistivity of the earth formations surrounding the well bore. In some cases current electrodes are used in conjunction with measuring potential electrodes to determine the formation resistivity.

In electrical induction logging it has been conventional practice in the past to provide a well logging sonde having a transmitting coil (or array) disposed thereon and a receiver coil (or array) at a spaced distance therefrom. Generally a high frequency alternating electric current is passed through the transmitter coil (normally at a frequency of approximately 20 kilohertz). The resulting electric fields produced from this high frequency alternating current in the earth formations surrounding the well bore are detected at the spaced receiver coil by sensing the induced currents or voltages in the receiver coil.

In both of these types of prior art resistivity (or conductivity) logging systems the usefulness of the system arises from the fact that earth formations having pore spaces therein filled with hydrocarbon molecules exhibit a higher resistivity than those earth formations having the pore spaces therein filled with either salt water or some conducting fluid.

Various problems have arisen in the interpretation of either conventional induction logging records or resistivity logging records of wells in areas where fresh water (relatively nonconductive such as less than 10,000 parts per million sodium chloride) are encountered. Such fresh water bearing sands or earth formations exhibit high resistivities (or low conductivities) much the same as those encountered in hydrocarbon bearing formations. In these cases it is difficult, if not impossible, to distinguish on the basis of the electric or induction well logging data alone whether an earth formation which is a prospective producing zone contains fresh water or hydrocarbon. It would therefore be very beneficial to provide a well logging system which on the basis of a single measurement of some of the physical characteristics of the earth formations in the vicinity of a well borehole could distinguish between fresh water bearing and hydrocarbon bearing earth formations.

Accordingly, it is an object of the present invention to provide a well logging system which is capable of distinguishing fresh water bearing earth formations from hydrocarbon bearing earth formations in the vicinity of a well borehole.

Another object of the invention is to provide an electrical measurement well logging system which is capable of measuring simultaneously the conductivity and dielectric constant of earth formations in the vicinity of a well borehole.

Another object of the present invention is to provide an induction well logging system operating at such high frequencies that the dielectric properties of the media surrounding the well borehole influence the measurement together with the conductivity characteristics of the material surrounding the well bore.

A still further object of the present invention is to provide a well logging system for measuring dielectric and conductivity properties of earth formations surrounding a well bore which is relatively uninfluenced by the borehole geometry, the conductivity of the drilling fluid used in drilling the borehole or the invasion of mud filtrate from the borehole into the surrounding earth formations.

BRIEF DESCRIPTION OF THE INVENTION

The above and other objects, features, and advantages are provided by a well logging system comprising a dual radio frequency dielectric induction logging system. In the well logging system of the present invention a downhole well logging sonde is provided which contains two different radio frequency dielectric measurement apparatuses. One radio frequency dielectric induction logging apparatus comprises a single coil 16 megahertz transmitting apparatus together with a spaced receiving apparatus. The second radio frequency dielectric induction logging apparatus comprises a focused dual coil 30 megahertz transmitting apparatus and uses the same receiving coil which is used with the 16 megahertz receiving apparatus. At these radio frequencies the physical characteristics of the earth formations surrounding the well bore which influence the high frequency alternating currents induced in these formations by the two transmitting apparatuses include both the dielectric constant (or permitivity) of the earth formations together with the conductivity (or resistivity) characteristics of the earth formations in the vicinity of the borehole. By measuring the amplitude of the received signal at each of these two radio frequencies, both the dielectric characteristics and the conductivity characteristics of the earth formations in the vicinity of the borehole may be determined. Novel apparatus for performing these amplitude measurements at the two different radio frequencies are provided together with means for interpreting the measured amplitudes at these two radio frequencies to derive the conductivity and the dielectric constant of the earth formations.

The novel concepts of the present invention are pointed out with particularity in the appended claims.

The invention is best understood by reference to the following detailed description thereof when taken in conjunction with the accompanying drawings in which:

DETAILED DESCRIPTION OF THE INVENTION

Induction and electrical resistivity logs have proven useful in the past in determining earth formation resistivity and thereby locating oil bearing sands in the vicinity of a well borehole. However, due to the fact that fresh water sands and oil sands have similar high resistivities these logs (conventional induction and resistivity) cannot adequately detect the difference between oil and fresh water filling the pore spaces of the earth formations in the vicinity of the borehole. At radio frequencies, however, the possibility of measuring both the formation electrical conductivity and formation permitivity can provide a means for distinguishing these types of liquid bearing strata. Hydrocarbons have a characteristically low dielectric constant $\epsilon_r$ less than 5. On the other hand fresh water has a relatively high dielectric constant $\epsilon_r$ approximately equal to 80. The permitivity of a material $\epsilon$, is defined as the natural electrical polarization of this material. In this description the terms relative permitivity and dielectric constant $\epsilon_r$ will be used synonymously. These quantities are related to the permitivity of free space $\epsilon_0$ by the relationship given in Equation 1:

$$\epsilon = \epsilon_r \epsilon_0 \quad (1)$$

where $\epsilon_0 = 8.854$ picofarads per meter, the permitivity of free space.

From electromagnetic field theory, and in particular from the theory of a point source oscillating magnetic dipole, the behavior of radio frequency fields in the vicinity of a cylindrical borehole may be expressed as in Equation 2 (the Helmboltz Equation in conventional cylindrical coordinates ($\rho$, $\phi$, and $Z$)

$$\left[ \frac{1}{\rho} \frac{\partial}{\partial \rho} \left( \rho \frac{\partial}{\partial \rho} \right) + \frac{1}{\rho^2} \frac{\partial^2}{\partial \phi^2} + \frac{\partial^2}{\partial z^2} + K^2 \right] \pi_z^{(m)} = - \frac{j}{\omega \mu} I^{(m)} \frac{\delta(\rho)\delta(z)}{\rho} \quad (2)$$

where $\pi_z^{(m)}$ is the hertz magnetic vector;
$I_{(m)}$ the magnitude of the current; and
$j = \sqrt{-1}$.
$K$ is the complex wave number given by Equation 3:

$$K^2 = W^2 \mu \epsilon + jW\mu \, 94 \quad (3)$$

In Equation 2 $\delta(\rho)$ and $\delta(z)$ are unit impulse functions of the dirac type.
$W = 2\pi f$ where $f$ is the frequency of oscillation of the point magnetic dipole.
$\epsilon$ is the electric permitivity of the media.
$\mu$ is the magnetic permitivity of the material surrounding the magnetic dipole and $\sigma$ is the electrical conductivity of the medium.

It will be observed that there are three physical constants associated with the material surrounding the oscillating point magnetic dipole in the above equations. These are the relative magnetic permeability $\mu$, the electrical permitivity $\epsilon$, and the electrical conductivity $\sigma$. For most earth formations at the frequencies of interest (10 to 60 megahertz) with respect to the present invention the relative magnetic permeability $\mu$ may be taken as a constant. Variations in $\mu$ in the earth materials of interest generally fall in the range of .001 to .1 percent. Thus, only the two media constants contributing a significant variation from one earth material to another at the frequencies of interest are $\epsilon$ and $\sigma$. These two physical characteristics have a direct effect on any very high frequency alternating electrical current flowing in the media. Both of these physical properties of the media have an effect on the magnitude and the phase with respect to the transmitter of these induced or eddy currents in formations in the vicinity of a well borehole.

Assuming a point magnetic source placed in a cylindrical borehole and responding to the Helmholtz equation, the total field is defined as the field of the source which is sensed by a receiver coil in any medium. The total field may be separated into a primary field and a secondary field. The primary field is defined to be the field of the source which is sensed by the receiver coil in some reference medium (such as vacuum or air). The secondary field is defined as the field which when added vectorially to the primary field, results in the total field. The primary field has an amplitude and a phase which are equal to the amplitude and phase of the total field in the reference medium. When the source is placed in a medium which is different from the reference medium, the secondary field adds vectorially to the primary field to produce the total field within the new medium. The primary field serves as an amplitude and phase reference for the determination of the secondary field.

The currents that flow in the medium surrounding the oscillating point magnetic dipole are called eddy currents. The eddy currents generate secondary fields, which in the case of a highly conductive medium, act to oppose the primary or reference field. However, when $\omega\epsilon$ (the angular operating frequency multiplied by the electrical permitivity) approaches the magnitude of $\sigma$ (the electrical conductivity) the eddy currents are phase shifted and may actually result in secondary fields which increase the magnitude of the total field. This is commonly the case when operating at the frequencies of interest in the present invention which generally may be stated to comprise radio frequencies from 10 to 60 megahertz.

Since changes in both $\epsilon$ and $\sigma$ effect changes in the eddy currents at any given frequency, the measurement of a single amplitude cannot separate the two effects. However, in accordance with the principals of the present invention, the measurement of the amplitude of the total field at two different frequencies $f_1$ and $f_2$ may be combined to derive $\epsilon$ and $\sigma$ simultaneously. Other techniques may also be used for this purpose but will not be discussed here.

The Helmholtz equation (Equation 2) is valid in any cylindrical layer of a layered medium surrounding the point magnetic dipole in the borehole. By use of a computer program to perfrom numerical integration of the solutions of Equation 2 in various cylindrical layers about such a point magnetic dipole and by applying boundary conditions at the interface of these regions and at the source, the total field at a receiver coil displaced a distance $z$, along the borehole axis from the point magnetic dipole may be derived.

Figure 4:
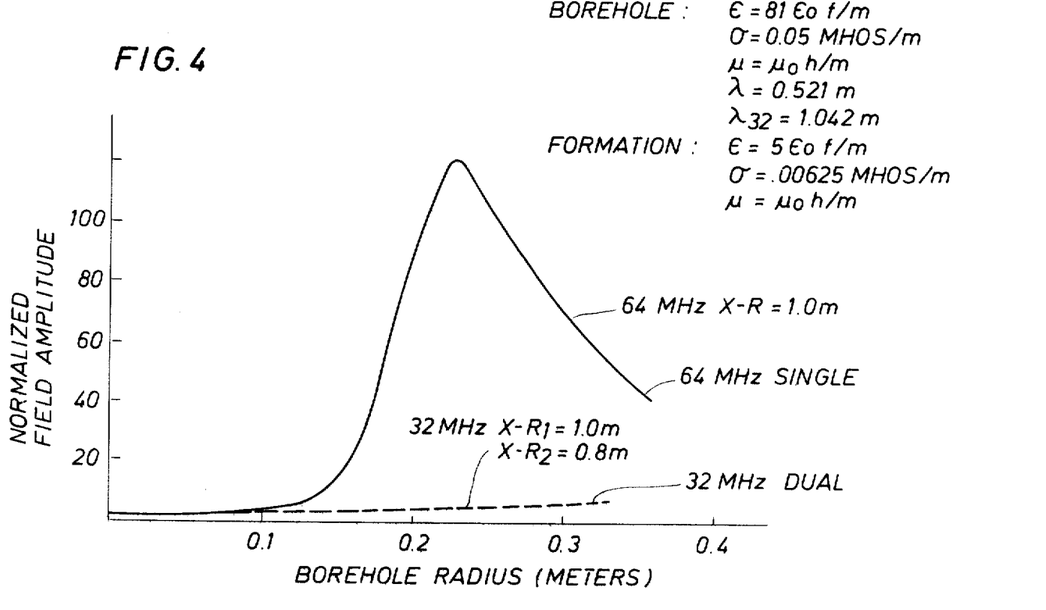
FIG. 4 is a theoretically derived graph illustrating the amplitude variation of a 64 megahertz single source radio frequency induction sonde for borehole diameters from 0 to .35 meters.

Through studies of the numerical solution of the Helmholtz equation, (Equation 2) in boreholes of various diameters, graphical representation of the amplitude of the field at a receiver coil as a function of the borehole diameter for various different size boreholes may be made. Such a graphical representation is shown in FIG. 4 for a 64 megahertz single coil transmitter and receiver system and for a 32 megahertz dual coil transmitter and single coil receiver system. It can be observed in FIG. 4 that at a frequency of 64 megahertz what appears to be an anomalous resonance effect occurs at a borehole radius of about 10 inches. It can also be observed that the 32 megahertz dual transmitter coil amplitude response does not exhibit this type of resonance effect for reasonably sized boreholes.

Figure 5:
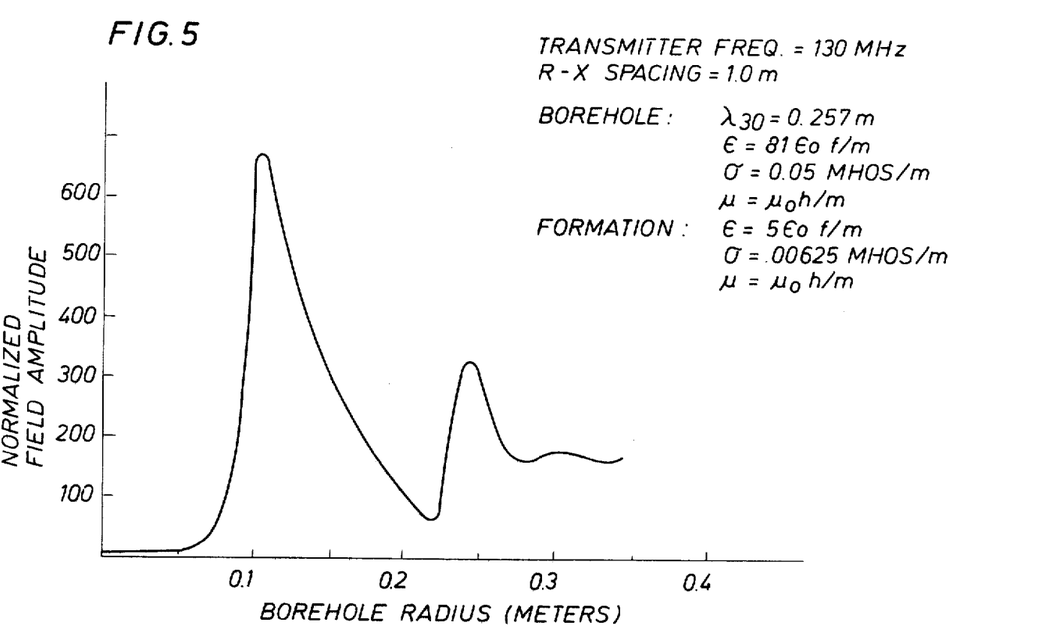
FIG. 5 is a theoretically derived graph illustrating the amplitude variation of a 130 megahertz single source radio frequncy induction sonde for borehole diameters from 0.0 to 0.4 meters.

Referring now to FIG. 5, a graphical representation illustrating the normalized total field amplitude at a receiver coil on the $z$ axis of the borehole as a function of the borehole radius for an operating frequency of 130 megahertz is illustrated. In this case the resonance effect is exhibited at a borehole radius of about .1 meters (4 inches) and again at a borehole radius of .25 meters (about 10 inches). Thus, if it were attempted to measure the dielectric and conductivity properties of the material surrounding the wellbore at frequencies as high as 64 megahertz, it is apparent from the graphical representations of FIGS. 4 and 5 that some correction would possibly be needed for these resonance effects. On the other hand, it will be remembered that in order to determine both the electrical conductivity and the permitivity (or dielectric constant) of the materials surrounding the well bore, measurements must be made of the amplitude of the received signal at least at two different frequencies in order to interpret the resulting amplitude measurements in terms of both the dielectric constant $\epsilon$ and the conductivity $\sigma$ of the earth formation surrounding the borehole. In order to avoid resonance effects such as those depicted in FIGS. 4 and 5, in the present invention amplitude measurements of the total field signals at a receiver coil situated in the borehole are made at frequencies of 16 and 30 megahertz. Theoretical calculations indicate that measurements made at such frequencies should be more accurate than those obtained at higher frequencies because of this borehole resonance effect. Measurements made at the dual frequencies of 16 and 30 megahertz should, similarly, be less susceptible to errors due to eccentering of the sonde in the borehole.

Figure 1:
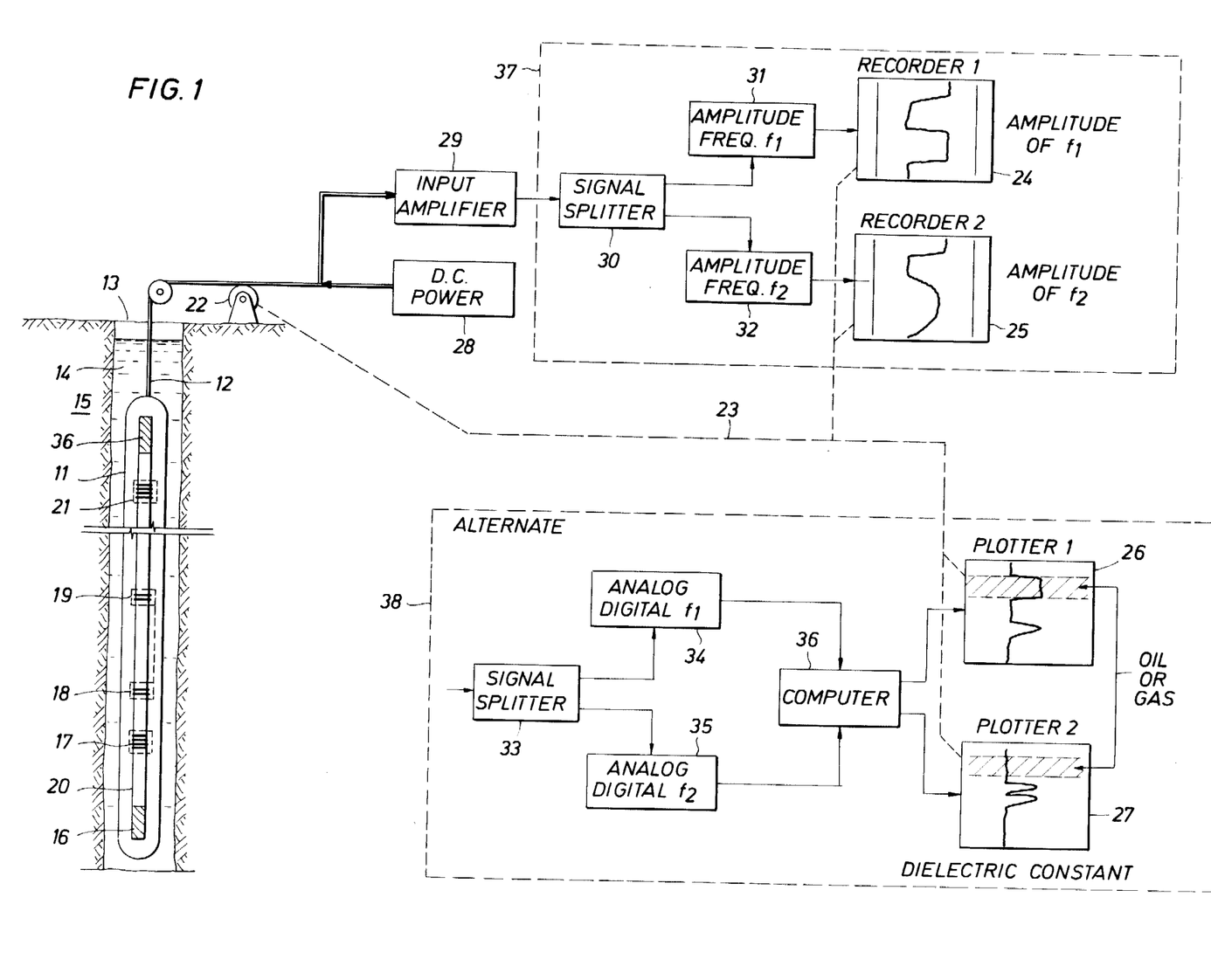
FIG. 1 is a block diagram illustrating the overall layout of a radio frequency induction dielectric logging system in accordance with the present invention.

Referring now to FIG. 1, a dual frequency induction dielectric well logging system in accordance with the concepts of the present invention is illustrated schematically. A well logging sonde 11 whose main body member is preferably constructed of fiber glass or some other nonconducting material of sufficient strength characteristics, is shown suspended by a well logging cable 12 in an uncased well borehole 13. The borehole 13 is filled with a borehole fluid 14 and is surrounded by earth formations 15 whose dielectric and conductivity properties are to be measured.

The lower portion of the well logging sonde 11 is seen to be basically comprised of a transmitter electronics section 16 and associated transmitting coils 17, 18, and 19 which are wound about a central strength member or mandrel 20. This mandrel 20 is also preferably comprised of a nonconducting material. The transmitter coil 17 is operated at a frequency of 16 megahertz and will be described in more detail subsequently. Transmitter coils 18 and 19 which are helically wound in oppposite directions to produce a reversed polarity pair comprise a focused or dual coil transmitter which is operated at a frequency of 30 megahertz. A receiver coil 21 is spaced axially along the axis of the sonde 11 from the transmitter coils and is situated approximately one meter from the center of 16 megahertz transmitter coil 17. The receiver coil 21 is situated approximately 32 inches from the midpoint of the 32 megahertz transmitter coil pair 18 and 19 whose centers are spaced apart by approximately 8 inches. It will be appreciated by those skilled in the art that while these transmitter to receiver coil spacings have been found useful in practicing concepts of the present invention, that they are intended as being illustrative only. It may be entirely practical to utilize other than the disclosed spacing distances between the transmitting and receiving coils and other coil spacings are considered to be within the scope of the invention.

The radial depth of investigation of the induction dielectric logging system of the present invention is influenced by the spacing distance between the transmitting and receiving coils. In general the longer the spacing between the transmitter and receiver coil, the deeper the radial depth of investigation into the earth formations in the vicinity of the borehole. However, it will be appreciated that it is necessary to space the transmitter and receiver coils close enough together to assure reception of a usable signal level from earth formations having various conductivity and dielectric properties. As a highly conductive material adjacent to the borehole will attenuate signals at the radio frequencies used in practicing the present invention substantially, then it would be required to utilize a higher transmitting power as the distance between the transmitter and receiver coils is increased.

A conventional winch arrangement 22 is shown at the surface and is used for moving the sonde 11 through the borehole during the well logging operation. The winch 22 may be electrically or mechanically linked to data recorders 24 and 25 or 26 and 27 which are used to record signals from the downhole sonde 11 as a function of its depth in the borehole 13. Power for operation of the downhole receiver electronics 36 is provided on conductors of the well logging cable 12 by a surface power source 28. Electrical measurement signals detected by the receiver electronics portion 36 of the logging tool 11 are amplified by an input amplifier 29 and supplied to signal processing circuitry 37 or 38.

Receiver output signals from the downhole electronics 36 will be described in more detail subsequently, but generally may be considered as being comprised of two amplitude measurements which are transmitted on the cable 12 conductors and separated at the surface by frequency discrimination. That is to say the amplitude information from one operating frequency is sent up the cable 12 at a first intermediate frequency $f_1$ while the amplitude information from the second operating frequency is sent up the cable 12 conductor at a second intermediate frequency $f_2$.

Considering first the signal processing circuitry 37, the dual frequency input signal from the well logging cable 12 is amplified by an input amplifier 29 and supplied to a signal splitter circuit 30. Signal splitter circuit 30 may comprise relatively high Q frequency filtering means, for example, which divides the signal into its two component frequencies $f_1$ and $f_2$. The signal at frequency $f_1$ is supplied to an amplitude detector circuit 31. The amplitude information is then supplied to a recorder 24 which records the amplitude at $f_1$ as a function of borehole depth. The second amplitude detector 32 detects the amplitude information sensed at the frequency $f_2$ and supplies this to a second recorder 25 which also records this information as a function of borehole depth.

Alternatively, the arrangement of signal processing apparatus 38 may be used. In the signal processing apparatus 38 the dual frequency input signal is supplied to a signal splitter 33, which may be similar to signal splitter 30 previously described, and divided into its two different intermediate frequency components $f_1$ and $f_2$. Analog to digital circuitry 34 is used to detect the amplitude of the signal at frequency $f_1$ and to convert this into a digital number form. Similarly, analog to digital circuitry 35 is used to detect the amplitude of the signal at intermediate frequency $f_2$ and to convert this information into digital number format. The digital signals furnished by analog to digital amplitude detectors 34 and 35 may then be supplied to a single small general purpose computer 36 which may comprise, for example, a PDP 11 Computer as furnished by the Digital Equipment Company of Cambridge, Massachusetts. This information may then be interpreted by the use of programs in the small general purpose digital computer 36 directly in terms of the resistivity and dielectric constant properties of the earth formations surrounding the well bore 13. Digital output signals from the general purpose digital computer 36 may then be supplied to digital recorders 26 and 27 and recorded as a function of borehole depth as the well logging sonde 11 is moved upwardly through the borehole. The manner of determining the resistivity and dielectric constant information which is used in computer 36 will be discussed in more detail subsequently.

Figure 2:
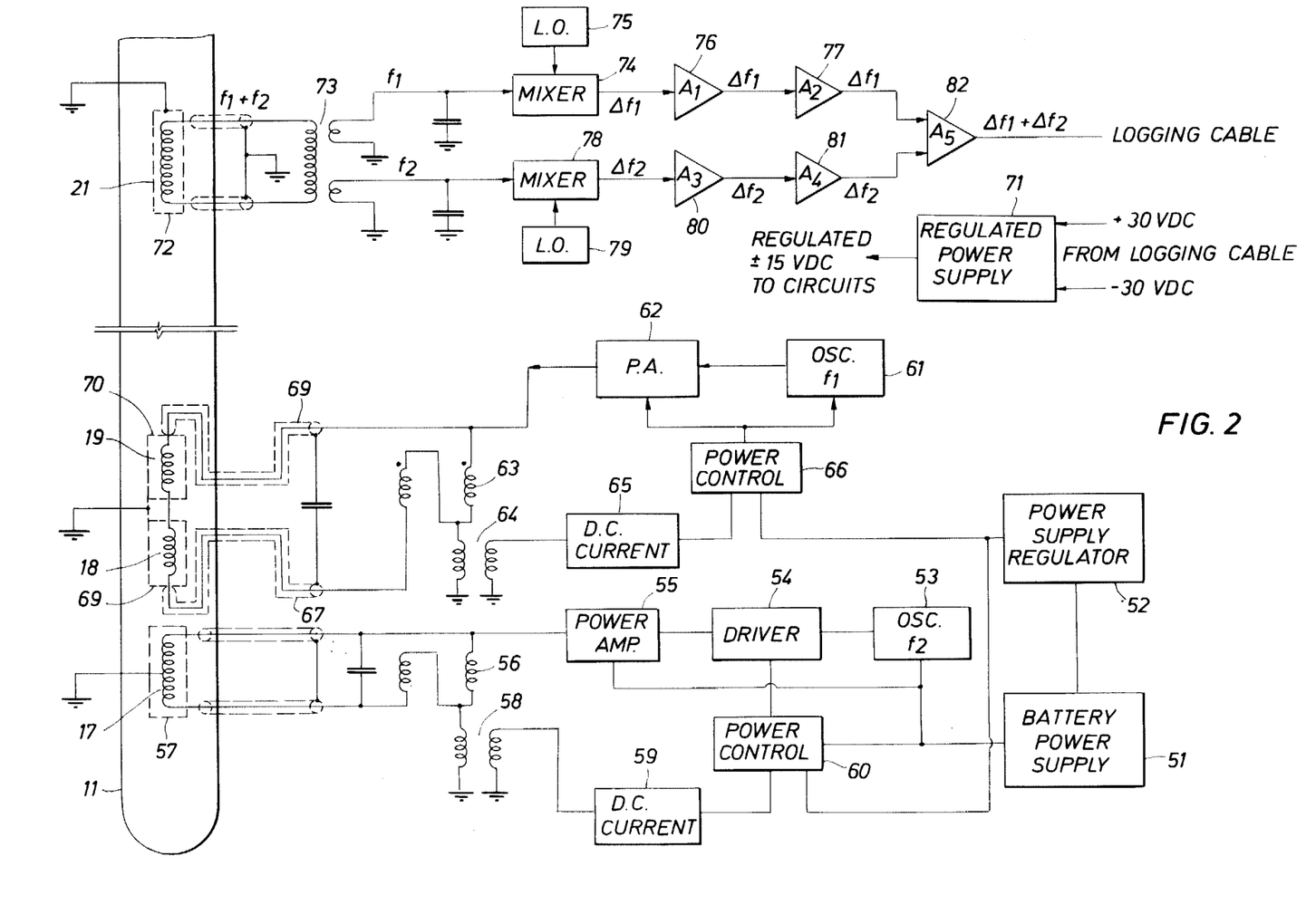
FIG. 2 is a schematic block diagram illustrating the downhole transmitting and receiving apparatus of the radio frequency induction logging system of the invention.

Referring now to FIG. 2, the downhole logging sonde 11 together with the transmitting and receiving electronics is shown in schematic block diagram form. Direct current voltage for the operation of the transmitting circuitry is supplied by battery power supply 51 and a power supply regulator 52. The transmitter circuitry for the 16 megahertz transmitter comprises a crystal controlled oscillator 53 which operates at the transmitter frequency of 16 megahertz. Output from the crystal controlled oscillator 53 is supplied to a driver circuit 54, the gain of which will be controlled in a manner to be subsequently described. The amplified 16 megahertz output of the driver stage 54 is supplied to a power amplifier stage 55 for amplification to a power level of approximately 1 watt. The 16 megahertz output of power amplifier 55 is balun coupled via balun 56 to the transmitter coil 17 of the 16 megahertz transmitter. An electrostatic shield 57 is provided about the transmitter coil 17. The transmitter output current in the balun 56 is monitored via a pickup winding 58 and is detected by a DC $\alpha$ current circuit 59 which produces an output signal used by power control circuitry 60 to control the gain of the driver stage 54. In this manner a constant current output is provided from the power amplifier 55 to the transmitter coil 17.

The 30 megahertz transmitter comprises a crystal controlled oscillator 61 operating at the 30 megahertz frequency which supplies a 30 megahertz output signal to a power amplifier 62 which amplifies the signal to approximately a 1 watt output level. The 30 megahertz output signal from power amplifier 62 is coupled via balun 63 and shielded feed lines 67 and 68 to the 30 megahertz dual coil transmitting coils 18 and 19. Dual transmitting coils 18 and 19 are also enclosed in electrostatic shields 69 and 70. The output current from power amplifier 62 is monitored via pickup winding 64 in balun 63 and supplied to a DC $\alpha$ current detector 65. The output signal from DC $\alpha$ current detector 65 is supplied to a power control circuit 66 which applies a control voltage to both the power amplifier 62 and the crystal controlled oscillator 61. In this manner the 30 megahertz transmitter output current is maintained at approximately a constant level.

Referring now to the receiver circuitry of FIG. 2, operating voltage for this circuitry is supplied via a regulated power supply 71 which produces ±15 volts DC for operation. Input power to the regulated power supply 71 is provided from conductors on the logging cable which is supplied from the surface. The receiver coil 21 which is also contained in an electrostatic shield 72 receives simultaneously signals from currents induced in the formation by both the 16 megahertz transmitter arrangement and the 30 megahertz transmitter arrangement. The received signals at both 16 and 30 megahertz are coupled from the receiver coil 21 into the receiver electronics via signal splitter coil 73. The signal splitter coil 73 has secondary windings which are tuned to the 16 and 30 megahertz frequencies of the received signals. The signal from the 16 megahertz winding of signal splitter 73 is coupled into mixer stage 74. Mixer stage 74 is also supplied with the output signal (16.010MHz) from a crystal controlled oscillator 75. After the mixing action has taken place in the mixer 74, an output signal at a first intermediate frequency of approximately 10 kilohertz is supplied to amplifier stages 76 and 77. Similarly, the 30 megahertz signal produced on the 30 megahertz tuned secondary winding of signal splitter 73 is supplied to a mixer stage 78 which is also supplied with a 30.025 megahertz output signal from crystal controlled oscillator 79. Due to signal mixing action of the mixer stage 78 an output signal is provided from the mixer stage 78 at an intermediate frequency of approximately 25 kilohertz which is supplied to amplifier stages 80 and 81. The 10 kilohertz output signal from amplifier stage 77 and the 25 kilohertz output signal from amplifier stage 81 are both supplied to a summing amplifier 82 which acts to sum these two signals and supply an output signal consisting of both of the summed input signals to a conductor of the well logging cable 12 for transmittal to the surface. This sum signal which is sent to the surface on the well logging cable thus contains the amplitude information of the received signals at receiver coil 21 from formation currents induced by both the 16 megahertz transmitter coil 17 and the dual coil 30 megahertz transmitter coils 18 and 19.

Figure 3A:
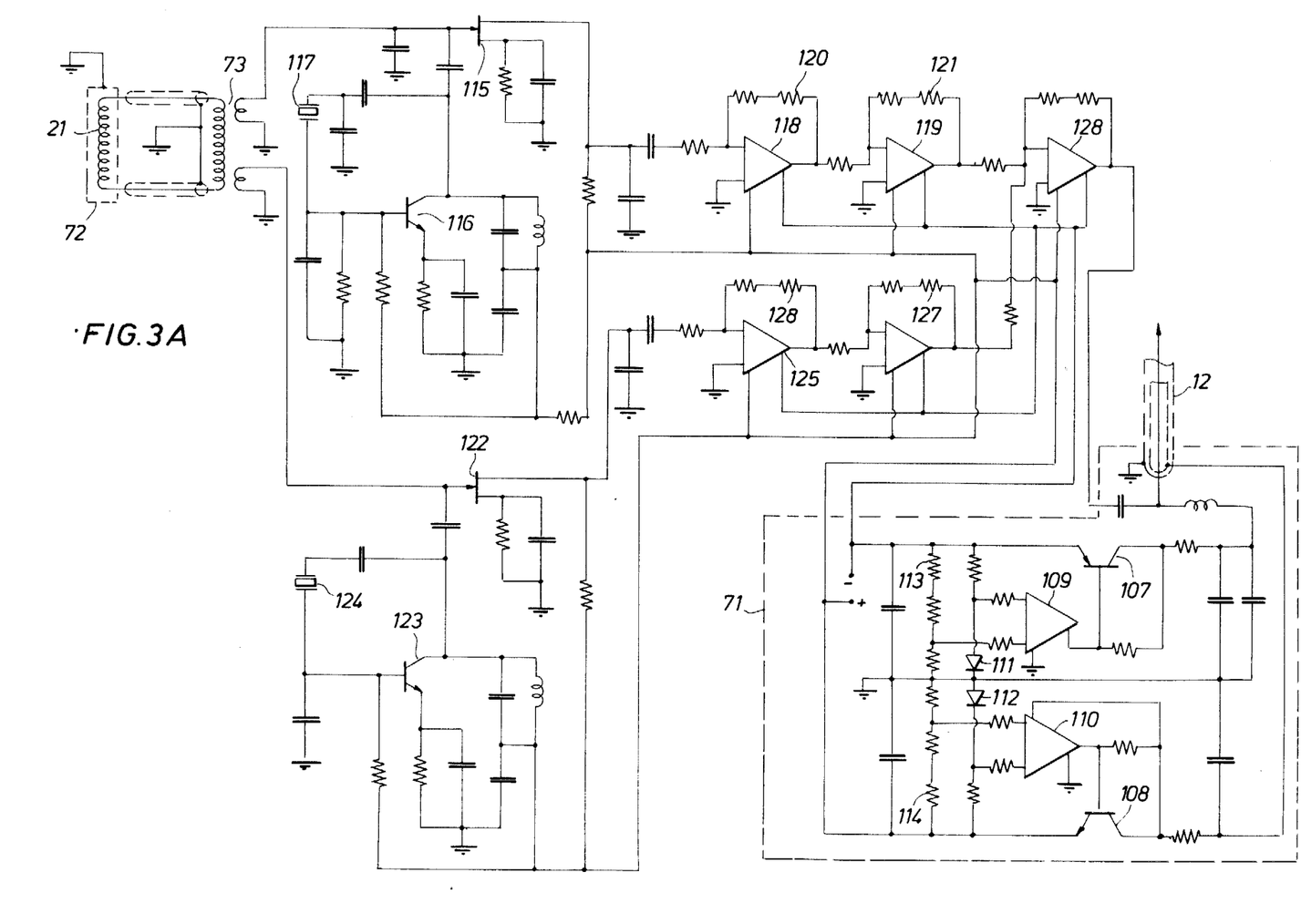
FIGS. 3a and 3b comprise a circuit diagram illustrating in more detail the downhole portion of the transmitting and receiving apparatuses of the radio frequency induction logging system of the invention.
Figure 3B:
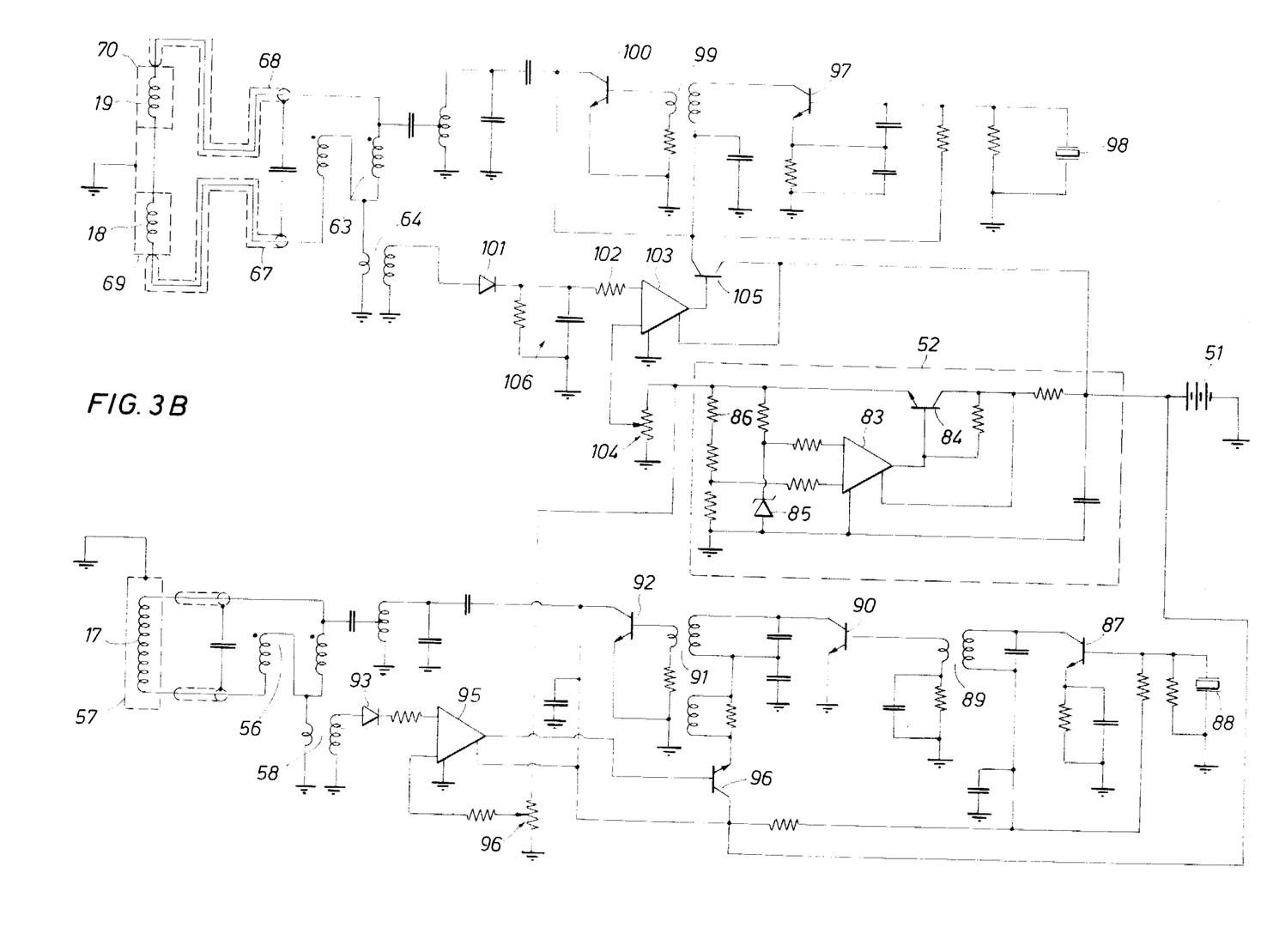

Referring now to FIG. 3, the circuitry shown in block diagram form in FIG. 2 is illustrated in more detail in the form of a circuit diagram. In FIG. 3 a temperature compensated power supply voltage regulator circuit 52 is shown comprising operational amplifier 83, transistor 84, diode 85 and sensistor (or temperature compensation resistor) 86. Power supply voltage regulator 52 serves to maintain a +15 volt regulated DC reference voltage from the nominal 32 volt battery 51 while the transmitting circuits are in continuous usage. It will be appreciated that as the transmitter circuits are used that the battery voltage supplied by the battery 51 may vary. The +15 volt DC reference voltage constancy is assured by the reference voltage regulator circuit 52. This reference voltage regulator circuit 52. This reference voltage is used in the constant current transmitter circuits which will be described in more detail subsequently. The 16 megahertz crystal controlled oscillator 53 of FIG. 2 is seen in FIG. 3 to be comprised of transistor 87 and 16 megahertz crystal 88 and associated circuit components. 16 megahertz output from the oscillator is transformer coupled via a transformer 89 to a Class C operated driver circuit (54 of FIG. 2) comprising transistor 90 and associated circuit elements. The amplified output signal from transistor 90 is again transformer coupled via transformer 91 to a power amplifier stage comprising transistor 92 and its associated circuit elements. The amplifier stage comprising transistor 92 furnishes an output power level of approximately 1 watt at 16 megahertz. The output signal from the amplifier stage comprising transistor 92 is coupled to the 16 megahertz transmitter coil 17 via a bifilar wound balun transformer 56. The bifilar wound balun transformer 56 is an impedance matching device which matches the output of the amplifier stage (55 of FIG. 2) to the impedance of the transmitter coil 17 (approximately a 4:1 impedance transformation). The use of the balun transformer 56 enables the transmitter coil 17 to be operated in a floating condition rather than having a return ground tap at any location on the coil. Of course, the electrostatic shield 57 about transmitter coil 17 is grounded so that only the radiated output signal from the transmitter coil itself enters the earth formation surrounding the borehole. At the center tap of bifilar wound balun transformer 56 a toroidal current sensing transformer 58 is provided. A peak detecting circuit comprising diode 93 and resistor 94 is supplied with the output of the toroid current sensing transformer 58 and performs the function of the DC $\alpha$ current peak detection 59 of FIG. 2. The peak voltage (which is proportional to the current in the bifilar wound balun transformer 56 is thus sensed and supplied to one input of operational amplifier 95. A reference voltage is supplied to the opposite input of operational amplifier 95 from potentiometer 96. Any difference between the reference voltage supplied from the potentiometer 96 and the peak voltage from the toroid current sensing transformer 58 is amplified by the operational amplifier 95 and supplied to the base of a series voltage regulator transistor 96, which performs the function of the power control circuit 60 of FIG. 2. As the battery voltage from the battery 51 is supplied to the collector of transistor 90, via the voltage regulator transistor 96, the control signal applied to the base of transistor 96 controls the magnitude of the voltage supplied to the collector of the transistor 90. Thereby, the gain of the driver stage comprising transistor 90 and its associated circuitry is maintained at a level sufficient to produce a constant current output from the power amplifier stage comprising transistor 92 and its associated circuitry as sensed by the toroid current sensing transformer 58.

The crystal controlled oscillator comprising transistor 97 and 30 megahertz crystal 98 and associated circuitry, comprise the 30 megahertz oscillator (corresponding to oscillator 61 of FIG. 2). The 30 megahertz output signal of the oscillator is transformer coupled via transformer 99 to a power amplifier stage comprising transistor 100 and its associated circuitry. Transistor 100 and its associated circuitry correspond to the power amplifier stage 62 of FIG. 2 and serves to directly amplify the 30 megahertz crystal oscillator signal to a power level of approximately 1 watt. The output signal from the power amplifier transistor 100 is coupled to the 30 megahertz transmitter coils 18 and 19 via a bifilar wound balun transformer 63 and shielded feed lines 67 and 68. The bifilar wound balun transformer 63 again serves as an impedance matching device between the power amplifier stage and the transmitter coils 18 and 19 (approximately a 4:1 impedance transformation). The output current of power amplifier transistor 100 is monitored in the bifilar wound transformer 63 via a toroid sensing transformer 64. The peak voltage produced in the secondary winding of toroid current sensing transformer 64 is detected by means of a peak detection circuit comprising diode 101, filter network 106 and resistor 102 which correspond to the DC $\alpha$ current sensing circuit 65 of FIG. 2. This peak voltage which is proportional to the current output of the power amplifier transistor 100 is supplied to one input of an operational amplifier 103. A reference voltage is supplied from potentiometer 104 to the opposite input of operational amplifier 103. A signal proportional to the difference between the reference voltage and the peak voltage detected in the secondary winding of toroid sensing transformer 64 is provided at the output of operational amplifier 103 and supplied to the base of series voltage regulating transistor 105. As the operational voltage for transistors 97 (the oscillator) and 100 (the power amplifier) are supplied via the voltage regulating transistor 105, the output signal from the operational amplifier 103 controls the magnitude of these voltages and thus regulates the output of the 30 megahertz transmitter to provide a constant current output as monitored by the toroid current sensing transformer 64. Again the use of the bifilar wound balun transformer 63 permits the transmitter coils 18 and 19 to be operated in a floating condition while, of course, the electrostatic shields 69 and 70 surrounding these coils are maintained at ground potential.

Regulated operating voltages for the receiver circuit are supplied by the regulated power supply circuitry 71 which comprises transistors 107, 108; operational amplifiers 109, 110; diodes 111, 112; and sensistors 113, 114. The sensistors 113 and 114 serve to temperature compensate the regulated voltage produced by the power supply due to any temperature effects on the transistors 107 and 108 and the operational amplifiers 109 and 110. A regulated output of ±15 volts DC is supplied for the operation of the receiver circuitry from the regulated power supply 71 which receives its input voltages from the conductors of the well logging cable.

The armored cable contemplated for use in the present invention comprises a triaxial well logging cable consisting (from the outside-in) of an outer armor shield, an insulating layer, a coaxial cable shielding layer, a second insulating layer and a center conductor, as depicted in FIG. 3a. While the logging system of the invention is preferably operated from this type of well logging cable, it will be appreciated by those skilled in the art that other types of multiconductor armored well logging cable as known in the art could be used if desired.

Still referring to FIG. 3, 16 megahertz and 30 megahertz signals induced in the formations from the two transmitters are received at the receiver coil 21 which is contained in an electrostatic shield 72 as previously discussed. These combined signals are supplied to a signal splitting transformer 73 having high Q secondary windings tuned to the 16 and 30 megahertz frequencies of the two system transmitters. The 16 megahertz signal from the signal splitting transformer 73 is supplied to the gate of field effect transistor (FET) 115 which serves as a mixer stage corresponding to mixer 74 of FIG. 2. The gate of field effect transistor 115 is also supplied with a 16.010 megahertz signal from a crystal controlled oscillator comprising transistor 116, crystal 117 and their associated circuit components. The 10 kilohertz output signal due to the mixing action of the field effect transistor 115 is supplied to the two stage temperature compensated amplifiers comprising operational amplifiers 118 and 119 and their associated circuitry which includes sensistors 120 and 121. Any drift in the operating characteristics of the operational amplifiers 118 and 119 are compensated for by the effect of sensistors 120 and 121.

Similarly, the 30 megahertz component of the received signal coil 21 is supplied to the gate of field effect transistor 122 which serves the function of the mixer 78 of FIG. 2. A 30.025 megahertz signal is supplied from a crystal controlled oscillator comprising transistor 123 and crystal 124 and their associated circuit components. This 30.025 megahertz signal is also supplied to the gate of the field effect transistor mixer stage 122. Due to the mixing action of field effect transistor 122, a 25 kilohertz output signal is provided at the drain of the field effect transistor 122 and is coupled to the two temperature compensated amplifier stages comprising operational amplifiers 125 and 126 which are temperature stabilized by sensistors 127 and 128 in the manner previously discussed. The 10 kilohertz and 25 kilohertz outputs of operational amplifiers 119 and 126, respectively, are supplied as input to a summing amplifier (corresponding to the summing amplifier 82 of FIG. 2) comprising operational amplifier 128. The operational amplifier 128 serves to sum these two intermediate frequencies signals and provide an amplified output of the summed signal for transmission to the surface via the center conductor of the triaxial well logging cable 12. At the surface the signals are amplified and then detected in either of the alternate manners described with respect to FIG. 1.

Figure 6:
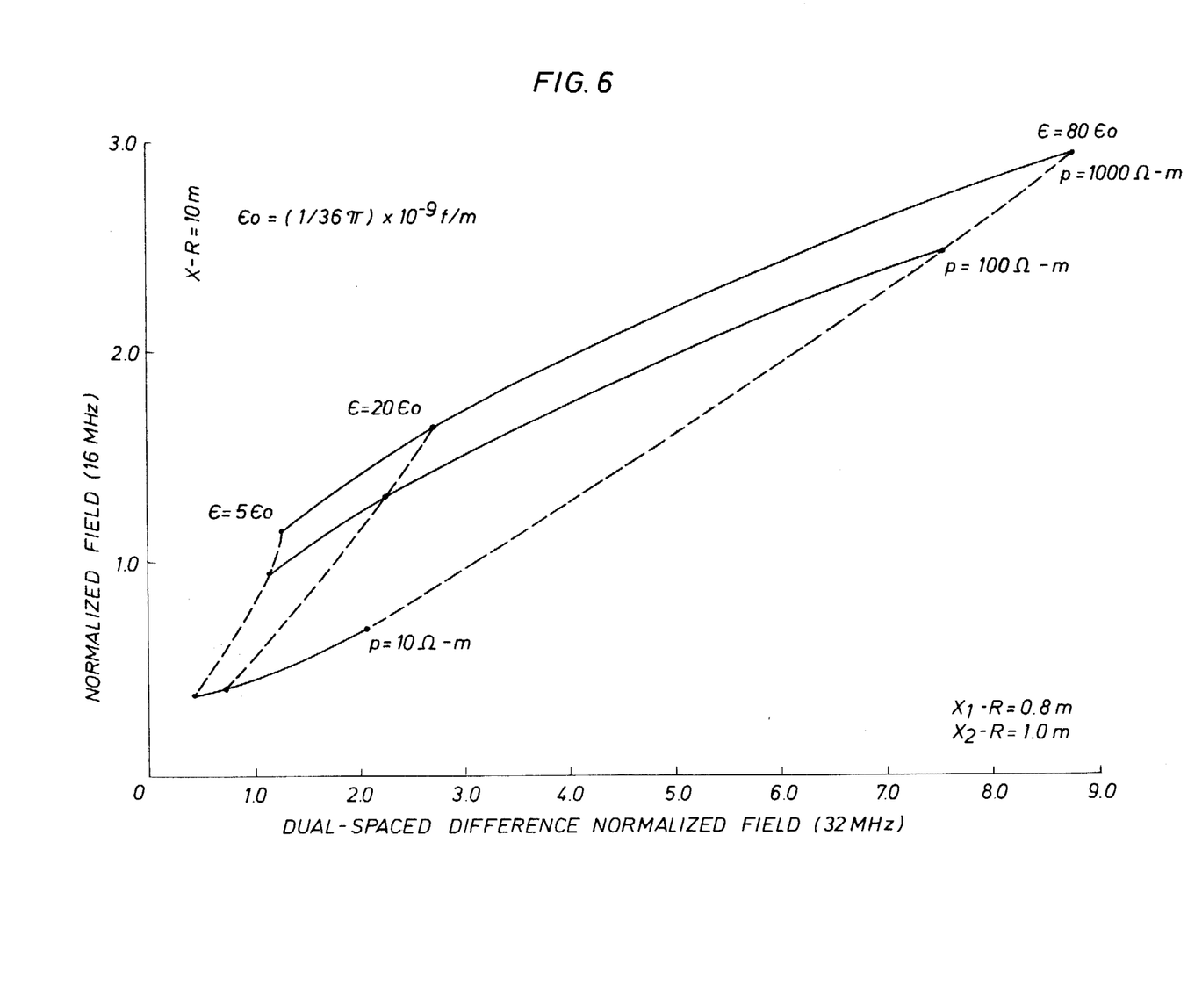
FIG. 6 is a theoretically derived cross plot of the amplitude response of a single source 16 megahertz radio frequency induction sonde and a dual spaced focused 32 megahertz radio frequency induction sonde (similar to that shown in FIG. 1) with the sonde embedded in a homogeneous material.
Figure 7A:
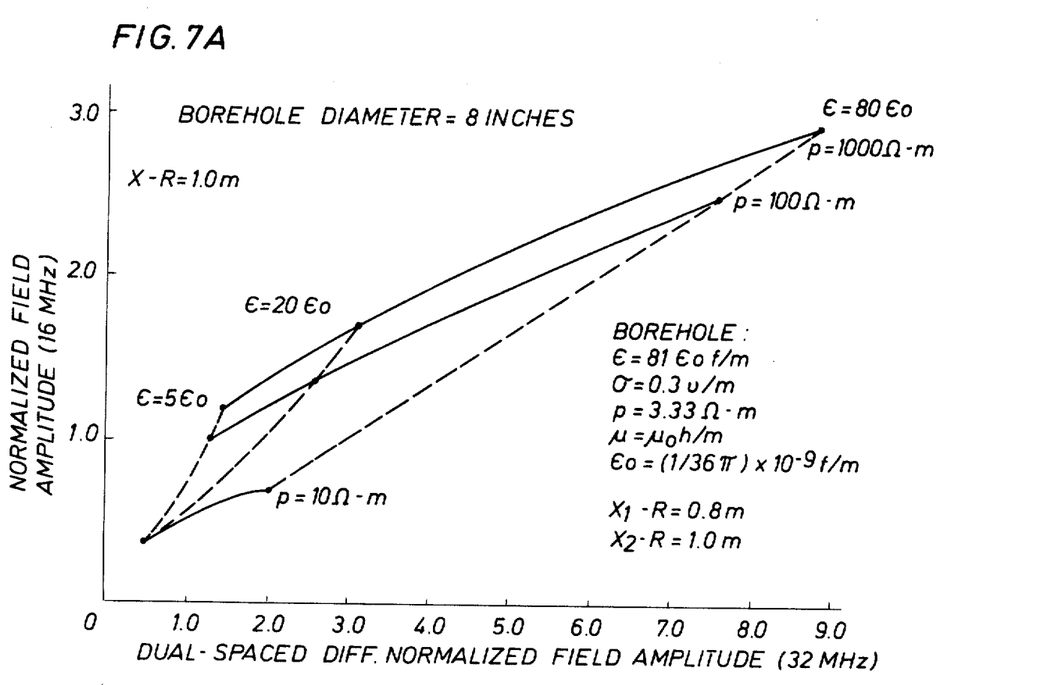
FIGS. 7A – 7D are theoretically derived cross plots of the amplitude of radio frequency induction measurements from a dual frequency sonde (such as that illustrated in FIG. 1) taken in fresh mud and in oil based mud filled well bores of 8 and 12 inch diameters.
Figure 7B:
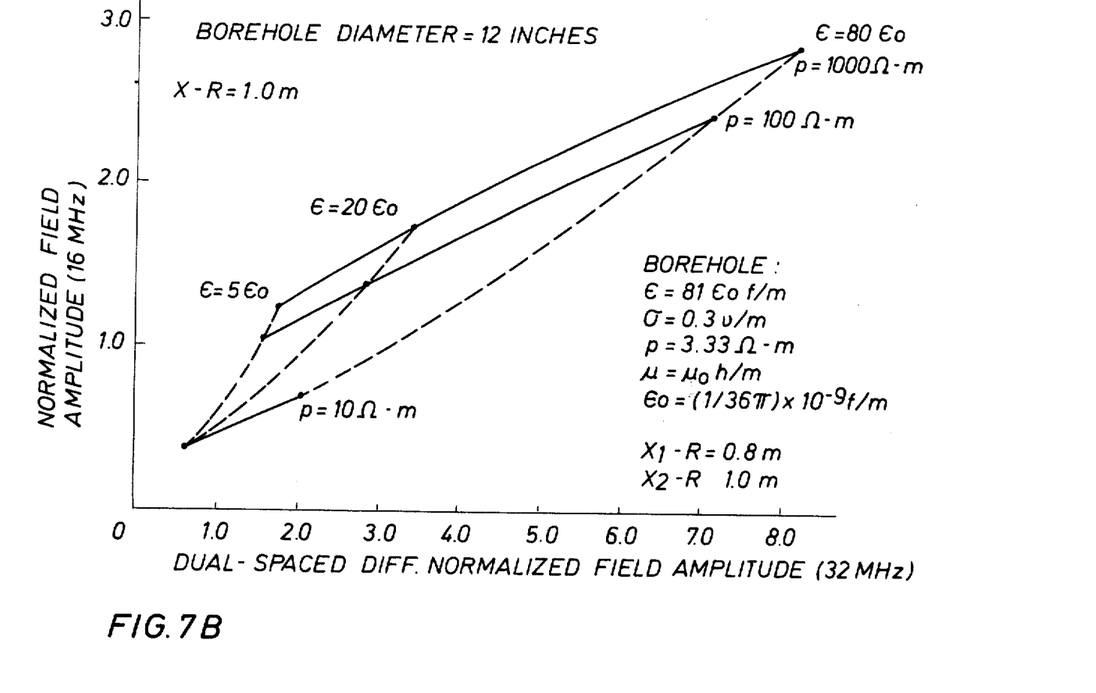
Figure 7C:
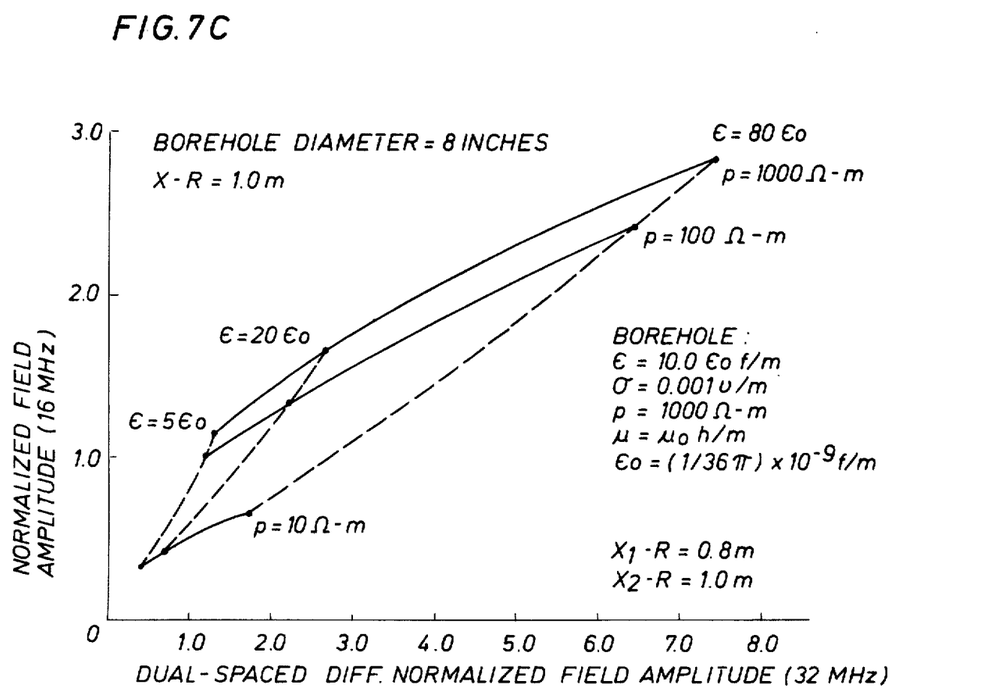
Figure 7D:
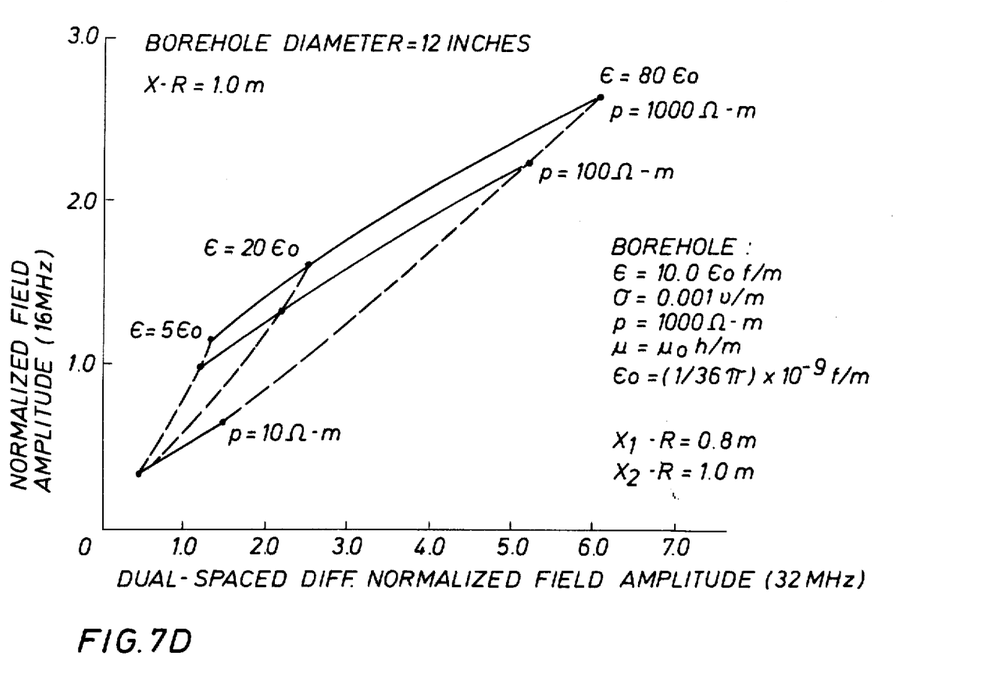

Referring now to FIG. 6, a theoretically derived graph of the response of a well logging system such as that described when embedded in a homogeneous medium is shown in graphical form. The normalized field amplitudes of the signals received at the receiver coil due to a dual coil 32 megahertz transmitter is plotted on the absissa while the ordinate contains a plot of the normalized field amplitude of the 16 megahertz receiver signal. By normalized it is meant here that the received signals are normalized to their corresponding value in air. That is to say, the amplitude of the signal received at a frequency of 30 meghaertz due to the dual transmitter coils in air is divided into the total field received at the receiver coil in the formation due to the 30 megahertz transmitted signal. Similarly the signal received at 16 megahertz at the receiver coil in the formation is divided by the amplitude of the 16 megahertz signal received in air.

The curves of FIG. 6, it should be observed, are a function of both the conductivity and dielectric properties of the homogeneous medium in which the well logging sonde is considered to be embedded for the purposes of the graphical representation of FIG. 6. It will be observed from FIG. 6 that while the amplitudes of the normalized field at both the 16 and 32 megahertz frequencies are both functions of the conductivity and dielectric properties of the earth formations that the amplitude of the 16 megahertz signal has considerably more dependence on the conductivity of the earth formation material than the 32 megahertz amplitude. Similarly, the 32 megahertz signal in a homogeneous medium is considerably more influenced by the dielectric properties of the material than is the 16 megahertz normalized signal.

The use of a dual coil transmitting arrangement illustrated in FIGS. 1, 2, and 3 at the 30 megahertz frequency insures a focusing effect on the 30 megahertz signal which causes deeper penetration of the 30 megahertz signal into the earth formations surrounding the borehole. The unfocused 16 megahertz signal would normally respond to formation materials located at shallower depths of investigation. However, since the 16 megahertz transmitter coil is spaced farther from the receiver coil than 30 megahertz dual transmitter coils, approximately the same radial zone of investigation would be investigated by each system in a homogeneous medium. However, it should be appreciated that due to variations in the dielectric and conductivity properties of the earth formations surrounding the borehole that this might not always be the case. In some instances the high frequency 30 megahertz signal is kept from penetrating as deeply as it normally would in a lesser conducting medium by high conductivity invasion zones of conductive fluids from the borehole.

In any event, it will be appreciated that by making normalized total field amplitude measurements at the two different frequencies (16 megahertz and 30 megahertz) as disclosed with respect to the apparatus of FIGS. 1, 2, and 3, and by then referring to a cross plot of theoretically derived values for these amplitudes such as those illustrated in FIGS. 6 and 7a – 7d that a unique value for both the conductivity and dielectric constant of the material surrounding the borehole may be derived.

Referring now to FIG. 7, four graphical illustrations similar to that of FIG. 6 are illustrated. These graphs plot the dual spaced normalized field amplitudes at 32 megahertz against the normalized field amplitude at 16 megahertz. The graph of FIG. 7 illustrate the response of a dielectric induction logging system similar to that of FIGS. 1–3 as derived theoretically in both 8-inch and 12-inch diameter boreholes containing fresh mud (FIGS. 7a and 7b) and oil base mud (FIGS. 7c and 7d). Graphical representation of this type can be placed in tabular form in the memory of a small general purpose digital computer such as the computer 36 of FIG. 1. These representations may then be used to derive the resistivity and dielectric constant of the earth formations in the vicinity of the well borehole directly from the amplitude measurements of the normalized total field received at the 16 and 30 megahertz frequencies. The small general purpose digital computer 36 may be readily programmed to make these computations when supplied with information such as the borehole diameter and dielectric characteristics of the drilling fluid, which are known beforehand. Conventional interpolation and curve fitting techniques such as least squares may be used for this purpose. The programming of such techniques in a commonly used computer language such as FORTRAN would be apparent to one skilled in the art when supplied with the graphical information relating these amplitude measurements to the dielectric and conductivity characteristics of the earth formations in the form of the information contained in FIGS. 7a through 7d. Alternatively, the well logging system of FIGS. 1–3 could be calibrated in test pit boreholes having formations of known characteristics. The resulting calibration curves (similar to those of FIGS. 7a–7d) could then be used in a similar manner in computer 36.

The above description may make other alternative embodiments of the invention apparent to those skilled in the art. It is therefore the aim of the appended claims to cover all such changes and modifications as fall within the true spirit and scope of the invention.

We claim:

1. A system for determining the electromagnetic characteristics of materials in the vicinity of a well borehole, comprising:

means for generating, in a well borehole, a first, lower frequency, alternating electromagnetic field at a radio frequency in the range of approximately 10 to 20 megahertz;

means for generating, in a well borehole, a second, higher frequency alternating electromagnetic field at a radio frequency in the range of approximately 20 to 40 megahertz;

means for stabilizing the total electromagnetic flux emitted by said means for generating said first and second alternating electromagnetic fields to a constant value;

means for detecting, in a well borehole, at a longitudinally spaced distance from the locations where said first and second alternating electromagnetic fields are generated, the voltage amplitudes of the total electromagnetic field at said first and second frequencies and generating signals representative of said total field voltage amplitudes of the total electromagnetic field at said first and second frequencies; and means for recording said total field amplitude signals as a function of borehole depth.

2. The system of claim 1 wherein said means for generating said first and second frequency, alternating electromagnetic fields comprise a crystal frequency controlled electromagnetic wave transmitter having an oscillator stage and an output amplifier stage and coupled to a transmitting coil array.

3. The apparatus of claim 2 wherein said means for stabilizing the total electromagnetic flux emitted by said first and second electromagnetic field generating means comprises means for monitoring the current in said output amplifier stage and generating a current signal representative thereof, means for comparing said current signal with a predetermined reference level signal and for generating a difference signal representative of any difference therein, and means responsive to said difference signal for controlling the supply voltage to said output amplifier stage in such a manner as to minimize said difference signal.

4. The apparatus of claim 3 wherein said output amplifier stages of said first and second means for generating said alternating electromagnetic fields are coupled to said transmitting coil arrays by first and second impedance matching balun transformers.

5. The apparatus of claim 4 wherein said balun transformers comprise bifilar wound transformers having input windings and output windings whose turns ratios are determined to effectively match the input impedance of said transmitting coil arrays to the output impedance of said output amplifier stages.

6. The apparatus of claim 5 wherein said balun transformers further comprise taps between said input and said output windings thereof, said taps being connected to the primary windings of current monitoring transformers whose secondary windings are connected to means for generating signals representative of the currents passing through said balun transformers.

7. The apparatus of claim 6 wherein said current monitoring transformers comprise transformers having their input and output windings wound about ferrite toroidal shaped cores.

8. The apparatus of claim 3 wherein said means for generating a current signal representative of the current in said output amplifier stages comprises transformer means for sampling the AC current in said amplifier stages, means for detecting the peak voltage in the secondary windings of said sampling transformers and for generating DC current signal representative of said peak voltage.

9. The apparatus of claim 8 and further including means for comparing said DC current signal with a reference level signal comprising means for generating a selectable variable reference level signal and differential amplifier means having two input terminals and means for supplying said DC current signal to one of said input terminals and means for supplying said reference level signal to the other of said input terminals whereby said differential amplifier produces DC output signals representative of any difference in said DC current signal and said reference level signal.

10. The apparatus of claim 9 and further including means responsive to said difference signal for controlling the supply voltage to said output amplifier stages comprising voltage regulating transistor means having its emitter and collector coupled in series relationship between a supply voltage source and the output side of said output amplifier stage and means for supplying said DC output difference signal to the base of said voltage regulating transistor whereby the voltage drop across said regulating transistor is controlled by the value of said DC output difference signal and hence the supply voltage presented to the output side of said output amplifier stage is also controlled thereby.

11. The apparatus of claim 2 and further including electrostatic shielding means disposed about said transmitting coil arrays.

12. A system for determining the electromagnetic characteristics of materials in the vicinity of a well borehole, comprising:
- means for generating, in a well borehole, a first, lower frequency, alternating electromagnetic field at a radio frequency in the range of approximately 10 to 20 megahertz;
- means for generating, in a well borehole, a second, higher frequency alternating electromagnetic field at a radio frequency in the range of approximately 20 to 40 megahertz;
- receiver coil means, in a well borehole, at a longitudinally spaced distance from the location where said first and second alternating electromagnetic fields are generated for receiving alternating electromagnetic field voltages induced therein at said first and second frequencies;
- means for converting said induced voltages at said first and second frequencies to two voltage signals representative thereof at two intermediate frequencies in the range of 1 to 40 kilohertz;
- means for transmitting said representative intermediate frequency voltage signals from the borehole to the earth's surface and for generating therefrom signals representative of the total field amplitudes at said first and second frequencies; and
- means for recording said total field amplitude signals as a function of borehole depth.

13. The apparatus of claim 12 wherein said converting means includes two crystal controlled oscillators operating at said first frequency plus or minus said first intermediate frequency and said second frequency plus or minus said second intermediate frequency.

14. The apparatus of claim 13 and further including means for mixing the voltages induced in said receiver coils at said first and second frequencies with the output of said crystal controlled oscillators and having output stages tuned to accept only the outputs from said mixing means which occurs at said first and second intermediate frequencies.

15. The apparatus of claim 12 wherein said means for transmitting said intermediate frequency signals to the earth's surface comprises a triaxial well logging cable having an inner conductor, an inner insulating layer, a shield layer coaxial with said inner conductor, an outer insulating layer and a torque balanced outer armor shell comprising at least two layers of armor.

* * * * *